United States Patent
Taylor et al.

[11] Patent Number: 5,982,117
[45] Date of Patent: Nov. 9, 1999

[54] METHOD AND APPARATUS FOR CONTROL OF A SWITCHED RELUCTANCE MOTOR

[75] Inventors: David G. Taylor, Marietta, Ga.; Saeed Ur Rehman, Rawal Pindi, Pakistan

[73] Assignee: Georgia Tech Research Corp., Atlanta, Ga.

[21] Appl. No.: 08/978,316

[22] Filed: Nov. 25, 1997

Related U.S. Application Data

[63] Continuation of application No. 08/530,839, Sep. 20, 1995, abandoned.

[51] Int. Cl.$^6$ .................................................... H02K 23/00
[52] U.S. Cl. ............................................ 318/254; 318/701
[58] Field of Search ...................................... 318/254, 701

[56] References Cited

U.S. PATENT DOCUMENTS

| | | | |
|---|---|---|---|
| 4,584,506 | 4/1986 | Kaszmann | 318/254 |
| 4,739,240 | 4/1988 | MacMinn et al. | 318/696 |
| 4,772,839 | 9/1988 | MacMinn et al. | 318/696 |
| 4,896,089 | 1/1990 | Kilman et al. | 318/701 |
| 4,933,620 | 6/1990 | MacMinn et al. | 318/696 |
| 4,959,596 | 9/1990 | MacMinn et al. | 318/254 |
| 4,961,038 | 10/1990 | MacMinn | 318/696 |
| 4,990,843 | 2/1991 | Moren et al. | 318/701 |
| 5,097,190 | 3/1992 | Lyons et al. | 318/701 |

*Primary Examiner*—David Martin
*Attorney, Agent, or Firm*—Deveau, Colton & Marquis

[57] ABSTRACT

A method for estimating and controlling the rotor position of a SRM comprises the steps of sampling phase currents and estimating phase fluxes from at least one excited phase of the SRM, sampling phase currents and estimating phase inductances from at least one unexcited phase of the SRM, and estimating the rotor position by determining a rotor position that is common to the estimated phase flux and the estimated phase inductance solutions to predetermining flux and inductance models. The estimation of rotor position can be less sensitive to measurement noise by applying a least squares technique. Once the rotor position has been estimated by the above method, the position of the rotor can be controlled so as to provide an overall effective control of the SRM. In particular, once the position of the rotor is estimated, the excitation provided to the motor is then adjusted to urge the rotor from its current position, velocity or torque toward a desired position, velocity or torque.

20 Claims, 9 Drawing Sheets

METHOD AND APPARATUS FOR CONTROL OF A SWITCHED RELUCTANCE MOTOR

RELATED APPLICATIONS

The present application is a continuation application of application Ser. No. 08/530,839 filed Sep. 20, 1995 abandoned. The disclosure of Taylor, et al. is hereby incorporated by reference herein.

BACKGROUND OF THE INVENTION

1. Field of the Invention

The present invention relates, in general, to a method and apparatus for controlling switched reluctance motors (SRMs) and, more specifically, is directed to a sensorless position and velocity control for SRMs using rotor position estimation based on the measurement of flux and inductance of the phases of the SRM.

2. Description of Related Art

A SRM is a brushless, salient pole electrical machine with multiple poles on both the rotor and stator. The stator has phase windings, unlike the rotor which is unexcited and has no windings or permanent magnets mounted thereon. Rather, the rotor of a SRM is formed of a magnetically permeable material, typically iron, which attracts the magnetic flux produced by the windings on the stator poles when current is flowing through them. The magnetic attraction causes the rotor to rotate when excitation to the stator phase windings is switched on and off in a sequential fashion in correspondence to rotor position.

For a SRM, the direction of the torque of a phase depends on rotor position and phase current magnitude, but not on the polarity of the current. Hence, not every phase of an SRM can produce torque in a desired direction at any given rotor position. When commutating a SRM, it is customary to associate each phase with either a productive phase group (phases which can presently generate torque of a desired direction) or an unproductive phase group (phases which presently can only generate torque of the opposing direction). Naturally, the membership in these phase groups is rotor position dependent and constantly changing. Optimal commutation of a SRM for maximum torque can be produced when every member of the productive phase group is excited and every member of the unproductive phase group remains unexcited.

For example, in a 3-phase SRM, either one or two phases (depending on the rotor position) can produce torque of a desired direction at one time. Therefore, an optimally commutated 3-phase SRM should normally be operated such that, at all times, at least one productive phase is excited and at least one unproductive phase remains unexcited. On the other hand, it should be noted that the optimal commutation of a 3-phase SRM will never lead to the occurrence where there are two or more simultaneously excited phases at all times, or two or more simultaneously unexcited phases at all times.

To provide this optimal commutation and control for a SRM, accurate and timely rotor position information must be obtained. Traditionally, the rotor position information required for stator phase current switching has been provided by such devices as Hall-effect sensors, optical switches, optical encoders, or resolvers. More recently, efforts have been made to dispense with the use of such mechanical position sensors in favor of rotor position estimators based on parameters determinable from the motor terminals. Two parameters which could be usefull in this endeavor are phase flux and phase inductance. They are known to be nonlinear functions of rotor position for a SRM but can be relatively easily calculated from motor phase currents and voltages. However, the rotor position information obtained is a double-valued function (within each electrical cycle) for either phase flux or phase inductance, for any fixed value of phase current. Thus, given a measurement of phase current and a calculation of either phase flux or inductance alone, only a pair of possible rotor positions can be determined.

For example, U.S. Pat. No. 4,772,839 issued to MacMinn (MacMinn I) discloses a rotor position estimator for SRMs which simultaneously measures changes in current in two unexcited phases, processes the measurements to provide a pair of possible rotor positions for each phase, and combines the positions in a fashion which attempts to yield a unique estimate of instantaneous rotor position. But, if the two phases of the SRM do not remain unenergized throughout the sampling period, or if any phase of the motor experiences a change of state during the sampling period, the MacMinn I estimator only provides an extrapolated rotor position in place of the estimated instantaneous rotor position. Moreover, the estimator disclosed in MacMinn I estimates rotor position based on the assumption that the IR drop (voltage drop due to electrical resistance of a phase) and the back EMF (the electromotive force caused by self induction of a phase) terms of the phase voltage equation are so small as to be negligible when estimating phase inductance, whereas such assumptions are not always valid. Specifically, back EMF may be a substantial portion of the phase voltage equation at high rotor velocities.

U.S. Pat. No. 4,959,596 issued to MacMinn, et al. (MacMinn II) discloses a SRM drive system in which a phase inductance sensing technique is used to indirectly estimate certain rotor positions. This technique involves applying voltage sensing pulses to an unexcited phase, which results in a change in phase current. The change in phase current is inversely proportional to the instantaneous phase inductance. Commutation time is determined by comparing the change in phase current to a threshold current, thus synchronizing phase excitation to a relative rotor position. Since no explicit determination of rotor position is obtained, the excitation to the phases cannot be shaped with respect to the position, limiting the control performance that can be achieved (e.g., position control is not possible).

U.S. Pat. No. 5,097,190 issued to Lyons, et al., (Lyons) discloses a rotor position estimator for a SRM based on instantaneous phase flux and phase current measurements. Phase current and flux sensing are performed for the phases in a predetermined sequence that depends on the particular quadrant of SRM operation, i.e., forward motoring, reverse motoring, forward generating, or reverse generating. For each phase in the predetermined sequence of sensing, phase flux and phase current measurements are made during operation in a pair of predetermined sensing regions, each defined over a range of the rotor positions. The rotor position estimates are derived from the phase flux and phase current measurements for each respective phase during the respective sensing regions thereof The rotor position estimates for each phase are normalized with respect to a common reference phase, and a rotor position estimate for the SRM is computed according to an equation which accounts for the fact that for any given rotor position determined, the rotor poles of the SRM may be approaching alignment or unalignment.

Therefore, the prior art generally fails to provide a continuously accurate and unambiguous determination of rotor position for all configurations of SRMs at all times, and a need exists for completely eliminating ambiguity in rotor position estimations for a SRM. It is to the fulfillment of this need that the present invention is directed.

SUMMARY OF THE INVENTION

In the preferred form, the present invention comprises a method and apparatus for estimating the rotor position of a SRM. The estimated rotor position can then be used in a closed loop SRM position or velocity control as the actual position of the rotor.

The method generally comprises the steps of sampling the phase currents and voltages of the SRM, estimating the phase flux for at least one excited phase of the SRM from the phase currents and voltages, estimating the phase inductance for at least one unexcited phase of the SRM from the phase currents and voltages, estimating the indicated rotor position domain from the estimated phase flux, estimating the indicated rotor position domain from the estimated phase inductance, and resolving the ambiguity in rotor position obtained from the indicated phase flux domain and the indicated phase inductance domain.

In the implementation shown, the ambiguity in the dual positions provided by the phase flux estimate on the one hand, and the dual positions provided by the phase inductance estimate on the other hand, is resolved effectively by determining which rotor position domain is unambiguously common to both estimates. This is accomplished according to the invention in a facile manner by using piecewise representations of the motor characteristics of phase flux and phase inductance. Each piecewise representation (one for phase flux as a function of phase current and rotor position and one for phase inductance as a function of phase current and rotor position), forming a surface in 3-dimensional space, is divided into a number of rectangular regions or domains which are assigned unique domain indicators. By choosing the common region where the domain indicators match, the ambiguity in rotor position is resolved. A unique rotor position estimate can then be reported as the common position calculated from the phase flux function and phase inductance function in the common domain using least squares data fitting.

According to one feature of the invention, the step of estimating the phase flux of at least one excited phase includes sampling the phase voltage and phase current, and taking an integration of the sampled phase voltage and phase current to obtain a phase flux estimate. This is advantageous because while phase flux is a function of both phase current and rotor position, its variation with respect to rotor position is greater for larger currents than for smaller currents. Therefore, by using an excited phase for phase flux measurement, noise errors can be reduced significantly.

According to another feature of the invention, the step of estimating the phase inductance includes applying a voltage pulse to at least one unexcited phase and measuring the change in current due to the voltage pulse. Although phase inductance varies with phase current and rotor position, the rotor position variation is more pronounced at low values of current than at higher values because magnetic saturation of the phase reduces the phase inductance. Therefore, by using an unexcited phase for phase inductance measurement, noise errors can be reduced significantly.

According to still another feature of the invention, the method provides for determining an accurate rotor position in a noisy environment where there may be some error in the measurements of phase flux and phase inductance. If the functions for the common domain do not yield solutions for the rotor position which are close enough to each other, then the functions in that domain can be written in their linear form of:

$$L = A_1(i) + A_2(i)\theta;$$

and $$\Psi = B_1(i) + B_2(i)\theta$$

where L is the estimated phase inductance, $\Psi$ is the estimated phase flux, $\theta$ is the angular rotor position i is the measured phase current, and $A_1$, $A_2$, $B_1$, $B_2$ are constants particular to that common domain.

The rotor position estimate is determined from a least-squares solution of these phase flux and phase inductance equations for the unknown rotor position $\theta$. In addition, the least-squares solution can be evaluated using different weights for each phase equation.

According to another aspect of the invention, a flux estimate for all excited phases and an inductance estimate for all unexcited phases is determined at all times. This is advantageous in several instances because these extra measurements can (a) assist in the resolution of the ambiguity in the common domain, (b) be used in the least squares solution as additional data points, or (c) be used in the weighting of the least squares equations to provide a more accurate rotor position estimate.

Once the rotor position has been estimated by the above method, the position of the rotor can be controlled so as to provide effective operation of the SRM. In particular, once the position of the rotor is estimated, the excitation or voltage provided to the motor is then adjusted to urge the rotor from its current position towards a desired position or to follow a desired position trajectory. In this way, a position controller is obtained, and the method of the present invention can be extended to obtain velocity, torque or other types of closed loop control as well.

A major advantage of the present invention is that the estimation made of the rotor position is unambiguous for all types of SRMs at any time and can be continuously updated at each sampling interval. This is in contrast to the prior art in which two different possible rotor positions exist for a given inductance or given flux estimation alone. By eliminating this ambiguity in the position information, much more effective control of the motor can be effected without needing to know other parameters, such as a prior history of rotor position or quadrant, the present direction of rotation, etc.

Accordingly, it is the primary object of the present invention to provide a method for estimating rotor position of a SRM which is simple, effective, and reliable in operation.

It is another object of the present invention to provide a method for estimating rotor position for a SRM which results in an unambiguous estimate of the position of the rotor for each sampling period.

It is another object of the present invention to provide accurate position estimations of the rotor of a SRM so as to provide or enable effective position, velocity, torque, or other control.

These and other objects, features and advantages of the present invention will become more apparent upon reading the following specification in conjunction with the accompanying drawing figures.

DETAILED DESCRIPTION OF THE DRAWINGS

Figure 1:
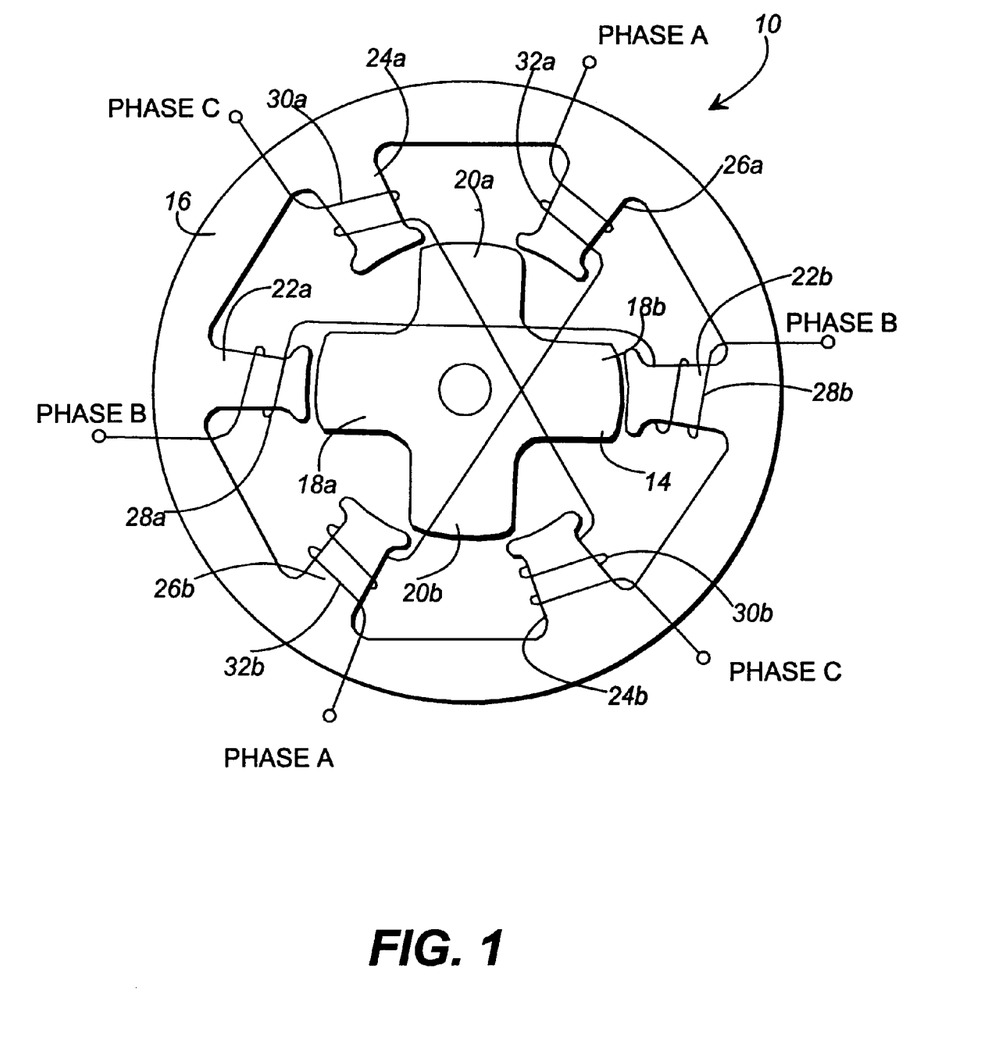
FIG. 1 is a mechanical and electrical schematic of a conventional 3-phase SRM which can be controlled to advantage according to the method of the invention.

FIG. 1 shows a conventional SRM 10 in electrical and mechanical schematic format along with its drive configuration for a three phase machine. The SRM 10 includes a rotor 14 rotatable in either a forward or reverse direction within a stationary stator 16. The rotor 14 has two pairs of diametrically opposite rotor poles 18a and 18b, and 20a and 20b, respectively. The stator 16 has three pairs of diametrically opposite stator poles 22a and 22b, 24a and 24b, and 26a and 26b, respectively. Each of the stator poles 22–26 has an associated stator pole winding 28a and 28b, 30a and 30b, and 32a and 32b, respectively. Conventionally, the stator pole windings on each pair of opposing or companion stator poles pairs are connected in series or parallel to form a machine phase. The example shown for SMR 10 is series wound with stator poles 26a and 26b and windings 32a and 32b forming phase A, stator poles 22a and 22b and windings 28a and 28b forming phase B, and stator poles 24a and 24b and windings 30a and 30b forming phase C of the machine.

Each phase A, B and C is electrically coupled to a power source which is then commutated or excited in a timed sequence to provide motion of the rotor 14 by magnetically attracting the rotor poles to the stator poles. The power source can be either current or voltage controlled, and either on the full time of a phase commutation or pulsed. In the illustrated implementation, the motor phases are driven by a variable voltage power source which is pulse width modulated (PWM).

Figure 2:
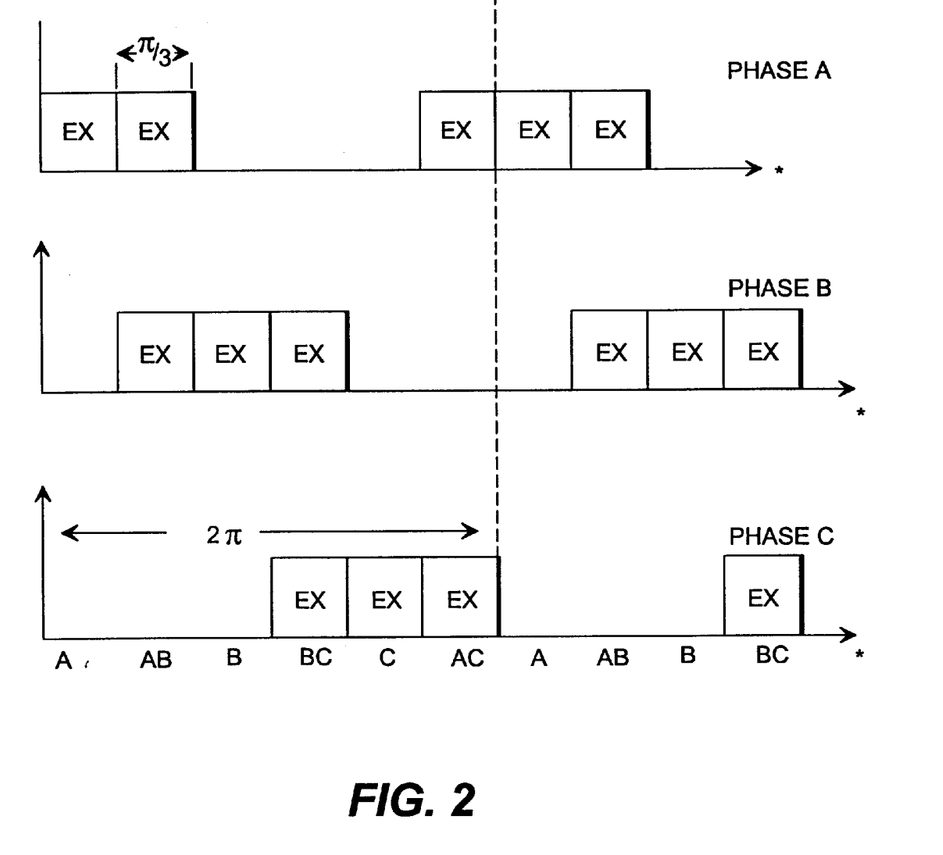
FIG. 2 is a pictorial waveform diagram of a typical excitation commutation sequence for the SRM illustrated in FIG. 1.

A typical and optimal commutation scheme for a three phase SRM of the configuration shown is to excite one phase, and then that phase again and the next sequential phase, then that next phase alone and so on. This excitation sequence is shown in FIG. 2 and is a commutation such that the excited phases cycle in sequence as Phases A, AB, B, BC, C, and CA over $2\pi$ electrical radians before repeating. Because the illustrated SMR 10 has a four pole rotor 14, this electrical sequence is repeated every $\pi/2$ mechanical radians or four times for one full revolution of the rotor 14. It is readily seen from FIG. 2 that the phase excitation alternates between one excited phase, two unexcited phases and two excited phases, one unexcited phase with each phase being rotated into and out of the sequence for one half of the electrical cycle. Therefore, a control based upon the measurement of a parameter for only an excited phase (or two excited phases) or for only an unexcited phase (or two unexcited phases) would be useful only 50% of the time. Conversely, there is always in the commutation sequence at least one excited phase and at least one unexcited phase.

Figure 3:
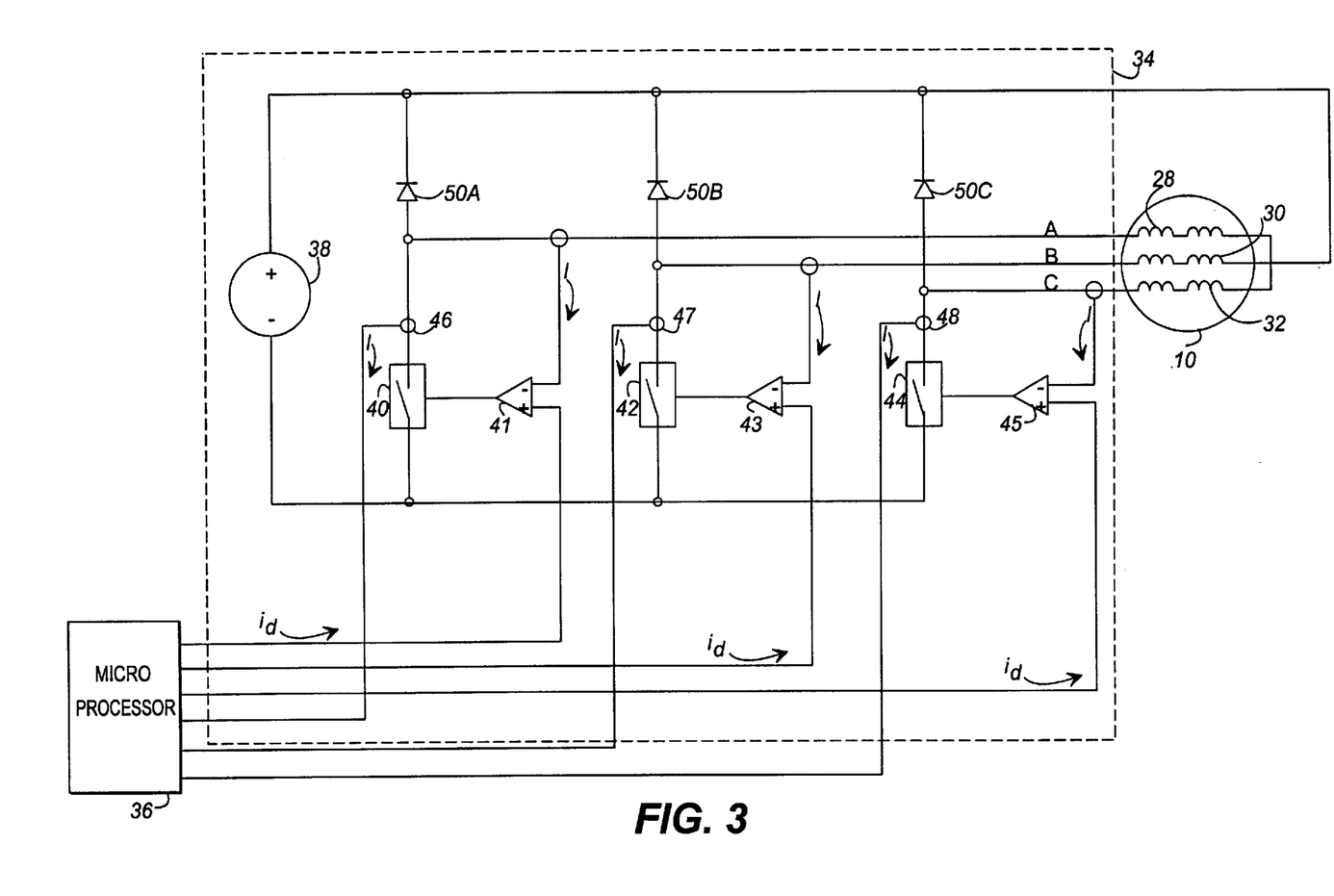
FIG. 3 is a schematic system block diagram of an SRM and controller for carrying out the method of the present invention.

Referring now to FIG. 3, an illustrative preferred implementation of an apparatus for carrying out the method of the present invention is depicted. In this illustrative configuration a SMR 10 is controlled without any traditional mechanical sensors connected to it by measuring only the input variables of the motor terminals, i.e., the phase voltages and phase currents. The SMR 10 as previously described contains internal phase or stator windings 28, 30 and 32 which are electrically connected to an amplifier 34. The amplifier 34 is modeled as a switchable DC voltage source 38 whose output connection to the windings is controlled by a microprocessor 36 to produce variable voltage excitations to each phase of the SMR 10 at controlled times. The amount of voltage excitation commanded at any time is determined by a closed loop control program being executed by the microprocessor 36. The excitation may be changed every program cycle, approximately every several tens of milisecs., for any phase and thus provides close control of the motor 10. Each phase A, B and C is commutated or switched between an excited state or unexcited state by its connection to the output of the amplifier 34 though a series of associated solid state switches (transistors, FETs, SCRs, or the like) 40, 42 and 44 which are controlled by the microprocessor 36 via its output lines. Comparators 41, 43, and 45 are connected to the control terminals of the switches 40, 42, and 44 and provide current control for the windings by having a feedback input (–) monitoring the actual current flow through the windings. Diodes 50a, 50b, and 50c, conventionally, allow current flow in the windings a recirculation path when the switches 40, 42, and 43 are opened. In this way, the amplifier 34 applies the controlled phase input voltages or excitations to the stator windings 28, 30 and 32 according to the commutation scheme illustrated in FIG. 2. The amplifier 34 in another preferred form is a conventional regulated switching power supply commonly used for SRMs. A set of current sensors 46, 47 and 48 measure the individual stator currents caused by the input voltages to the windings. These phase current measurements are input to the microprocessor 36 by way of sensor input lines and are available for updating the estimated parameters every program cycle.

Figure 4:
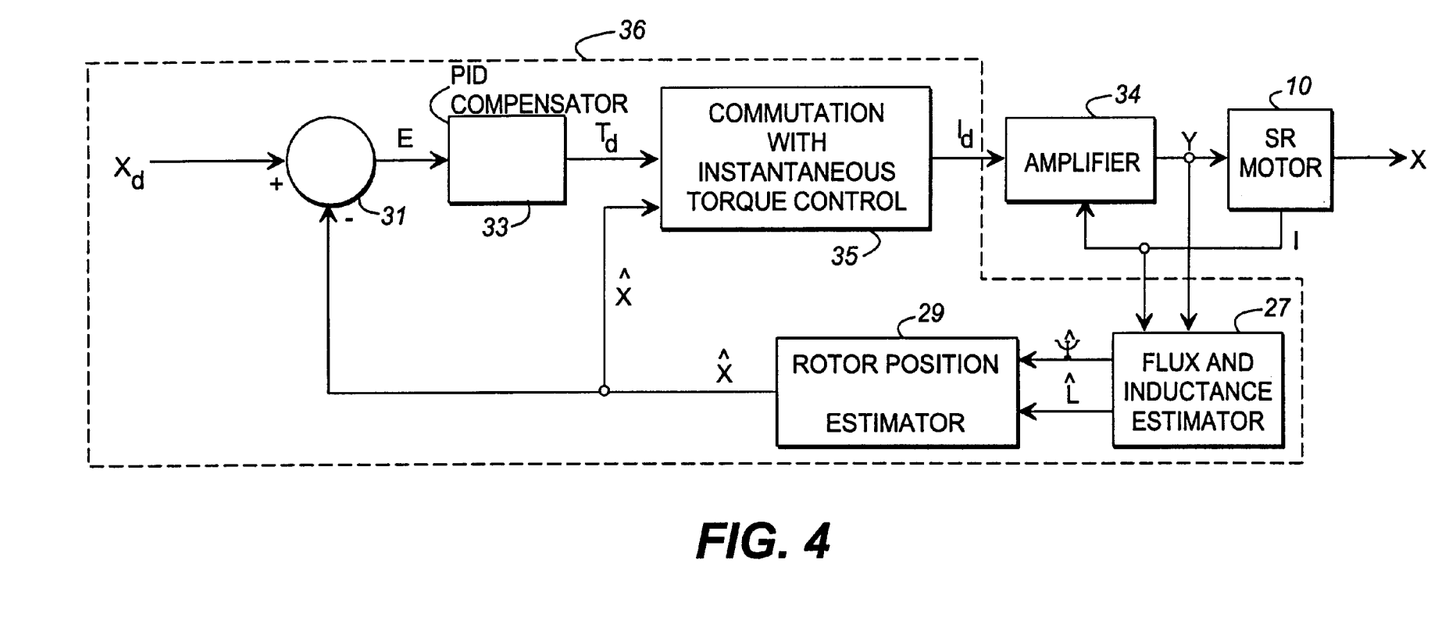
FIG. 4 is a functional block diagram of a control scheme implemented using the present invention to control the SRM illustrated in FIG. 3.

An illustrative closed loop sensorless position control for the system illustrated in FIG. 3, is shown in more detail in FIG. 4. The amplifier 34 and SMR 10 are controlled by the microprocessor 36 executing a closed loop control program which samples the phase voltages, v, and phase currents, i, at discrete intervals and supplies them to a flux and inductance estimator 27. Instantaneous estimations of the values of phase flux and phase current are calculated and transmitted to a rotor position and speed estimator 29. The estimated electrical rotor position is first calculated from the phase flux and phase inductance values and then translated into an estimated mechanical position X. This estimated mechanical position X is used in a difference node 31 as representative of the actual position of the rotor to form an error term between it and the demanded position $X_d$ from a user input. The error is fed to a PID compensator 33 having proportional, integral and derivative gain terms to change the error signal into a demanded torque which should null the position error. The demanded torque is input to a second control loop and commutator 35 of the control which also has input the estimated rotor position X which with a torque inverse model will give an representation of the required phase current to be developed by the SRM 10. An excitation command is output to the amplifier 34 which will tend to null the difference between the demanded and actual torque.

Figure 5:
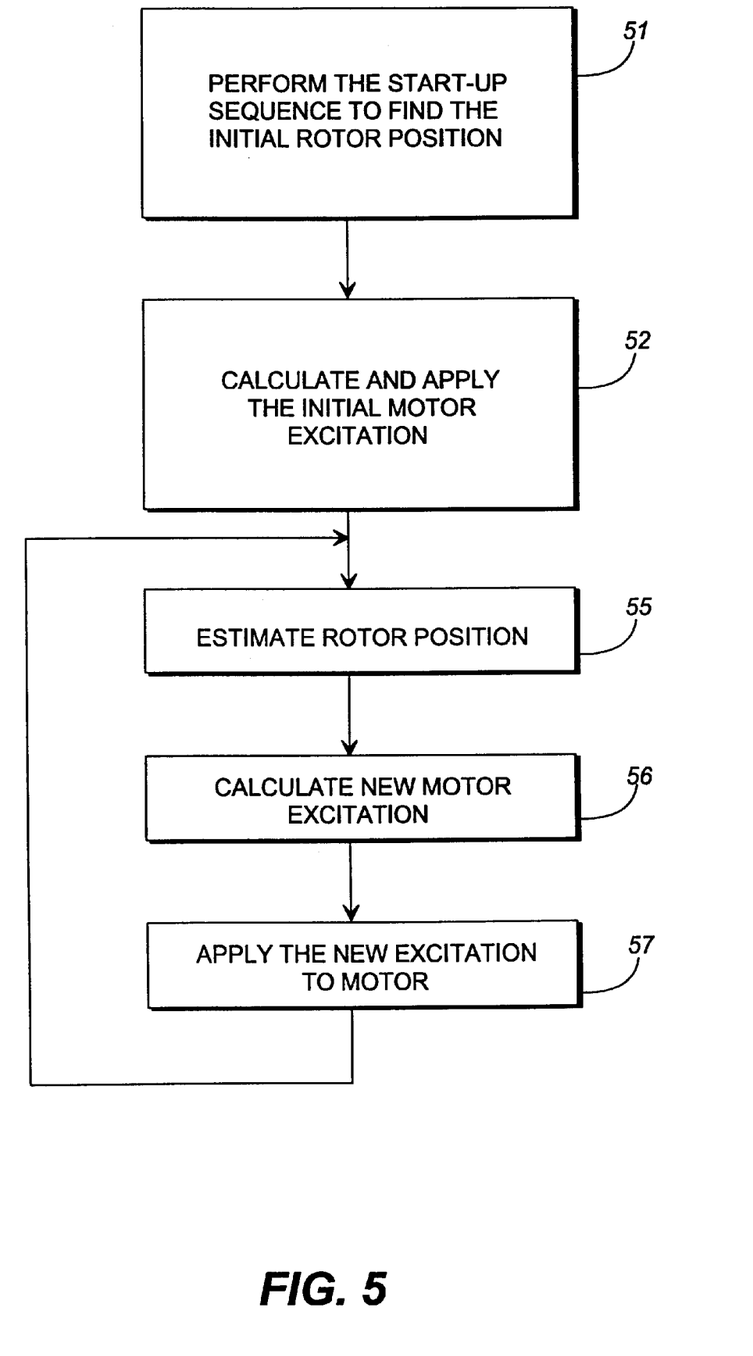
FIG. 5 is a system flow chart of the controller illustrated in FIGS. 3 and 4.

Referring now to FIG. 5, a functional system block diagram of the control method is depicted. As illustrated in the figure, a start-up sequence is performed to find the initial rotor position at Block 51. This may be accomplished by probing all the motor phases, estimating their phase inductances, and then estimating the initial rotor position from these inductance estimates. Alternatively, one motor phase may be energized to bring the rotor to a known position. Once the initial position is known, the initial excitation is calculated and applied to the motor at Block 52. After this initial excitation to the motor, the rotor position is estimated by the inventive method in Block 55. The new rotor position estimate is then used to calculate a new excitation to command the motor in Block 56 and the new excitation is applied to the motor in Block 57. This cycle continues as long as the motor is being operated under closed loop control.

Figure 6:
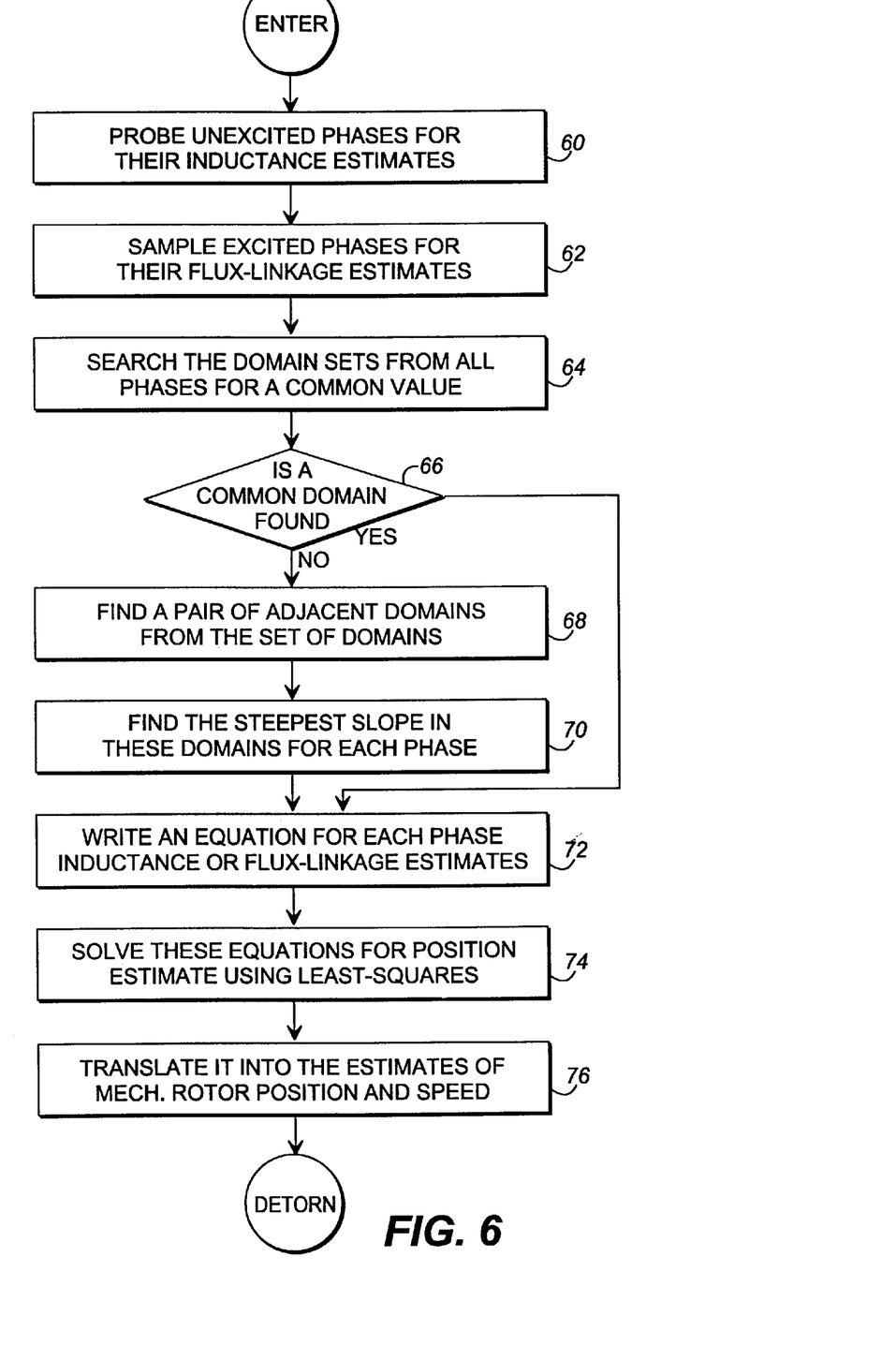
FIG. 6 is a detailed flow chart of the position estimation routine of the system flow chart illustrated in FIG. 5.

The routine used by microprocessor 36 to estimate rotor position and implement Blocks 27 and 29 of FIG. 4 will be now more fully described with reference to FIG. 6. The routine is called for each sampling time of the main control to provide continuous and accurate updated estimates of rotor position. When it returns to the main control program it provides an updated estimate of mechanical rotor position and velocity.

Initially, the unexcited phases are probed for inductance estimates in block 60. The commutator of element 35 in FIG. 4 tracks the sequence of excitations for the different phases according to the schedule of FIG. 2 and transfers this information to the rotor position estimator in order to determine which phases for the sampling period are unexcited. Inductance estimates are calculated for the phases from the respective phase currents and phase voltages. There are a number of methods for computing estimates of phase inductance for a SMR 10, given measurements of phase voltage and phase current which are disclosed in the prior art. A preferred method of the invention for estimating phase inductance for an unexcited phase is by evaluating the right-hand side of the equation:

$$\hat{L}(t) = \frac{v(t) - Ri(t) - e(t)}{i'(t)}$$

where v is the probing phase voltage, i is the phase current, R is the phase resistance, e is the back-emf, and the ' denotes time-differentiation. The computation can be reduced in complexity by making some approximations. For example, if the motor is operating in a relatively low-speed regime, then the back-emf can be assumed to be zero.

Thereafter, the excited phases are sampled for their flux estimates in block 62. The position estimator knows which phases are excited from the sequencer information stored for the sampling period in block 60. The flux estimates are calculated for the phases from the respective phase currents and phase voltages. There are a number of methods for computing estimates of phase flux for a SMR 10, given measurements of phase voltage and phase current which are disclosed in the prior art. A preferred method of the invention for estimating phase flux for an excited phase is by evaluating the right-hand side of the equation $$\hat{\Psi}(t) = \hat{\Psi}(t_o) + \int_{t_o}^{t} (v(t) - Ri(t))dt$$

where v is the phase excitation voltage, i is the phase current, R is the phase resistance, and $t_o$ is the instant at which time-integration begins. The computation can be reduced in complexity by making some approximations. For example, if the integration is synchronized with the excitation of the phase, then the initial phase flux at $t_o$ is zero.

Once at least one estimate of phase flux for an excited phase is made and at least one estimate of phase inductance for an unexcited phase is made, the process in block 64 then determines the domain sets produced by the solutions of the two models for the particular values of currents, phase fluxes, and phase inductances. Each phase will produce two domain indications for each value of current and phase flux or two domain indications for each value of current and phase inductance. The domain common to this set of at least four indications is chosen as the domain which contains the unambiguous solution.

There may be instances in which no common domain is found. These would occur when the error in measurement is relatively high and one of the solutions was near a domain boundary. In other words, the error may have pushed the solution into a neighboring domain. When the answer to the inquiry in block 66 is negative and no common domain is found, the process seeks solutions that have adjacent domains in block 68. When an adjacent domain case is found there must be some way to resolve the ambiguity between the adjacent domains. In such a case, the common domain is taken as the combination of the adjacent domains. But now there are two sets of coefficients to chose from to form the linear equations. Normally, it is the case that the function with the steeper slope at the parameter value (flux or inductance) will contain less error. Therefore, the slopes of the functions are measured in block 70 and that set of coefficients which produces the function with the steeper slope is chosen. Therefore, the coefficients for one domain may be chosen for the inductance function and coefficients for the adjacent domain may be chosen for the flux function. However, the equations for the functions are written to cover the expanded or joined domains.

When the common domain is found the equations for phase inductance and phase flux are formed in block 72 using the coefficient values stored for the particular domain. The equations can then be solved simultaneously using a least squares method in block 74 for the optimal estimate available for rotor position. This electrical position estimate is then translated into a mechanical position estimate in block 76 before the routine returns to the main control program.

The method of the present invention combines inductance estimates and flux estimates in the position estimation process and provides a unique single estimate at every sampling instant, generated using the latest phase current and voltage measurements, and hence never needs to extrapolate previous estimates. The method is capable of providing continuous estimates of rotor position and hence can be used either to simply commutate the motor at proper instants for average torque control, or can be used as part of a sensorless control scheme for instantaneous torque control.

The method uses a piecewise representation or model of the motor including a function of phase inductance L(θ, i) and a function of phase flux Ψ(θ, i). Each of these functions is dependent upon the two variables of rotor position, θ, and phase current, i, and thus represents a surface in a three-dimensional space. Each surface can be divided into a number of rectangular domains which overlap on the θ axis, and within each domain these functions can be modeled using simple linear equations, such as:

$$L(\theta, i) = A_1(i) + A_2(i)\theta$$

$$\Psi(\theta, i) = B_1(i) + B_2(i)\theta$$

The coefficients used to evaluate A(i) or B(i), in the above equations, vary from domain to domain and may be determined off-line from measured data. The model can be stored in the memory of the microprocessor 36 by storing the coefficients in look up tables associated with each domain. Thus, for the SMR 10 indicated in the drawings, six surfaces are modeled, one surface for phase flux and one surface for phase inductance for each of the three phases. As will be shown later, this piecewise representation makes it possible to estimate position using a linear least-squares formulation, thus adding a degree of noise immunity. For illustrative purposes, the six surfaces have been chosen to have six of such overlapping domains along the θ axis.

Although phase inductance varies with rotor position and phase current, this variation is more pronounced at low values of current than at higher values because magnetic saturation reduces the phase inductance. This can be seen from an inspection of the phase inductance model of the SMR 10 in FIG. 7. The invention uses this phenomenon to advantage by selecting an unexcited phase, instead of an excited phase, for the estimation of phase inductance. Therefore, by using an unexcited phase for phase inductance measurement, noise errors can be reduced significantly.

Figure 7:
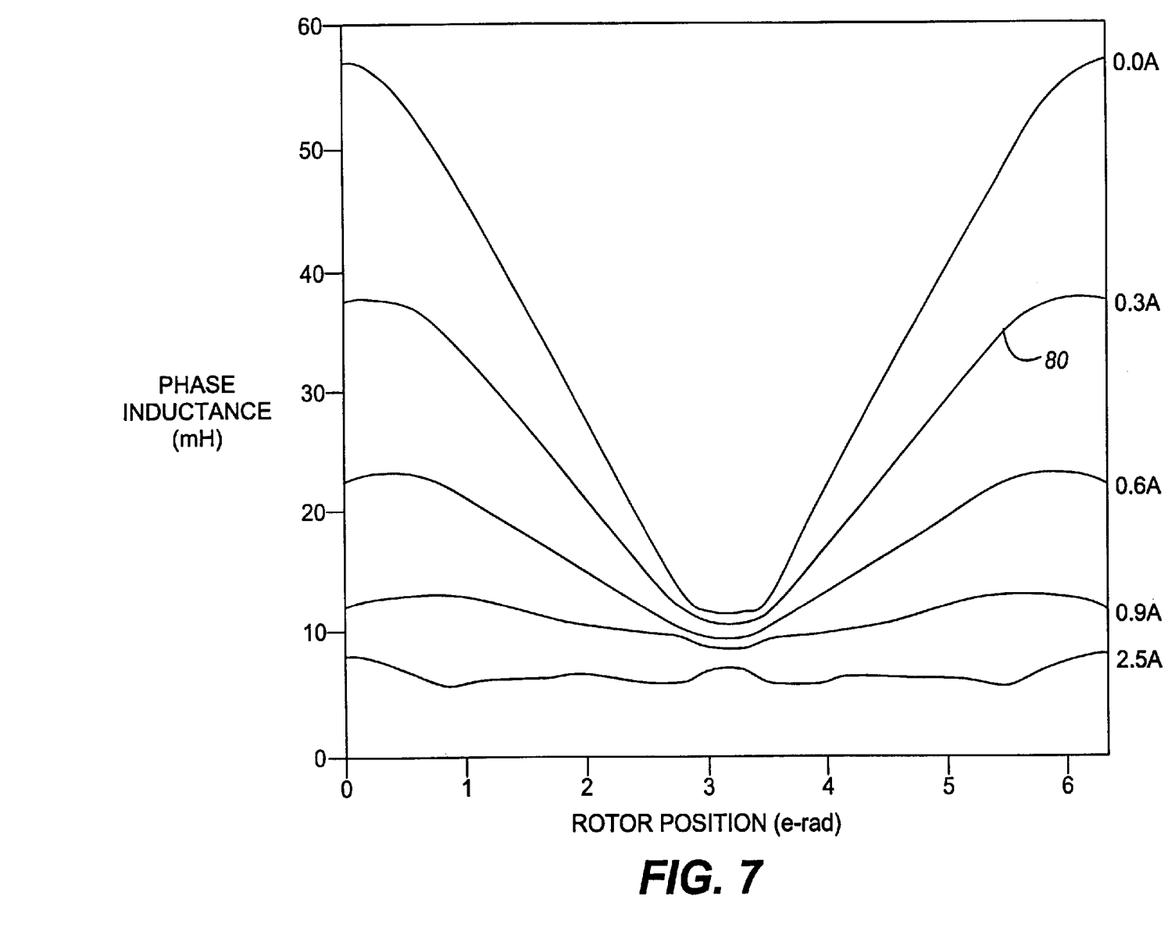
FIG. 7 is a pictorial representation of phase inductance as a function of rotor position for various values of phase current for one phase of the SRM.

FIG. 7 is the model of phase inductance for one phase and, since the SMR 10 has 3 phases, each phase will have a similar model offset some number of electrical degrees from the model of the other phases because of its mechanical location with respect to the other phases. The model illustrates that, for each value of phase current, there is phase inductance function, for example at 80, which is dependent upon rotor position. However, the representation of rotor position as a function of phase inductance for any fixed phase current is dual valued and the inversion of one function knowing the phase inductance will yield an ambiguous answer of two possible values of rotor position.

Conversely, phase flux is also a function of rotor position and phase current, but its variation with respect to rotor position is greater for larger currents than for smaller currents. This can be seen from an inspection of the phase flux model of the SMR 10 in FIG. 8. The invention uses this phenomenon to advantage by selecting an excited phase, instead of an unexcited phase, for the estimation of phase flux. Therefore, by using an excited phase for phase flux measurement, noise errors can be reduced significantly.

Figure 8:
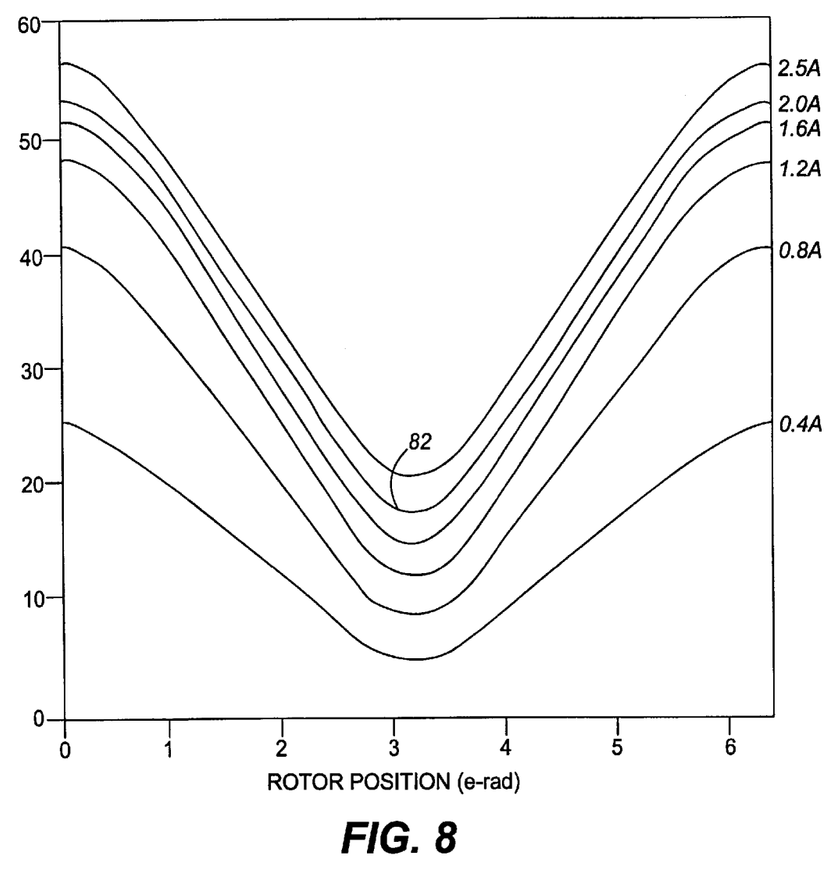
FIG. 8 is a pictorial representation of phase flux as a function of rotor position for various values of phase current for one phase of the SRM.

FIG. 8 is the model of phase flux for one phase and, since the SMR 10 has 3 phases, each phase will have a similar model offset some number of electrical degrees from the model of the other phases because of its mechanical location with respect to the other phases. The model illustrates that, for each value of phase current, there is phase flux function, for example at 82, which is dependent upon rotor position. However, the representation of rotor position as a function of phase flux for any fixed phase current is dual valued and the inversion of one function knowing the phase flux will yield an ambiguous answer of two possible values of rotor position.

Figure 9:
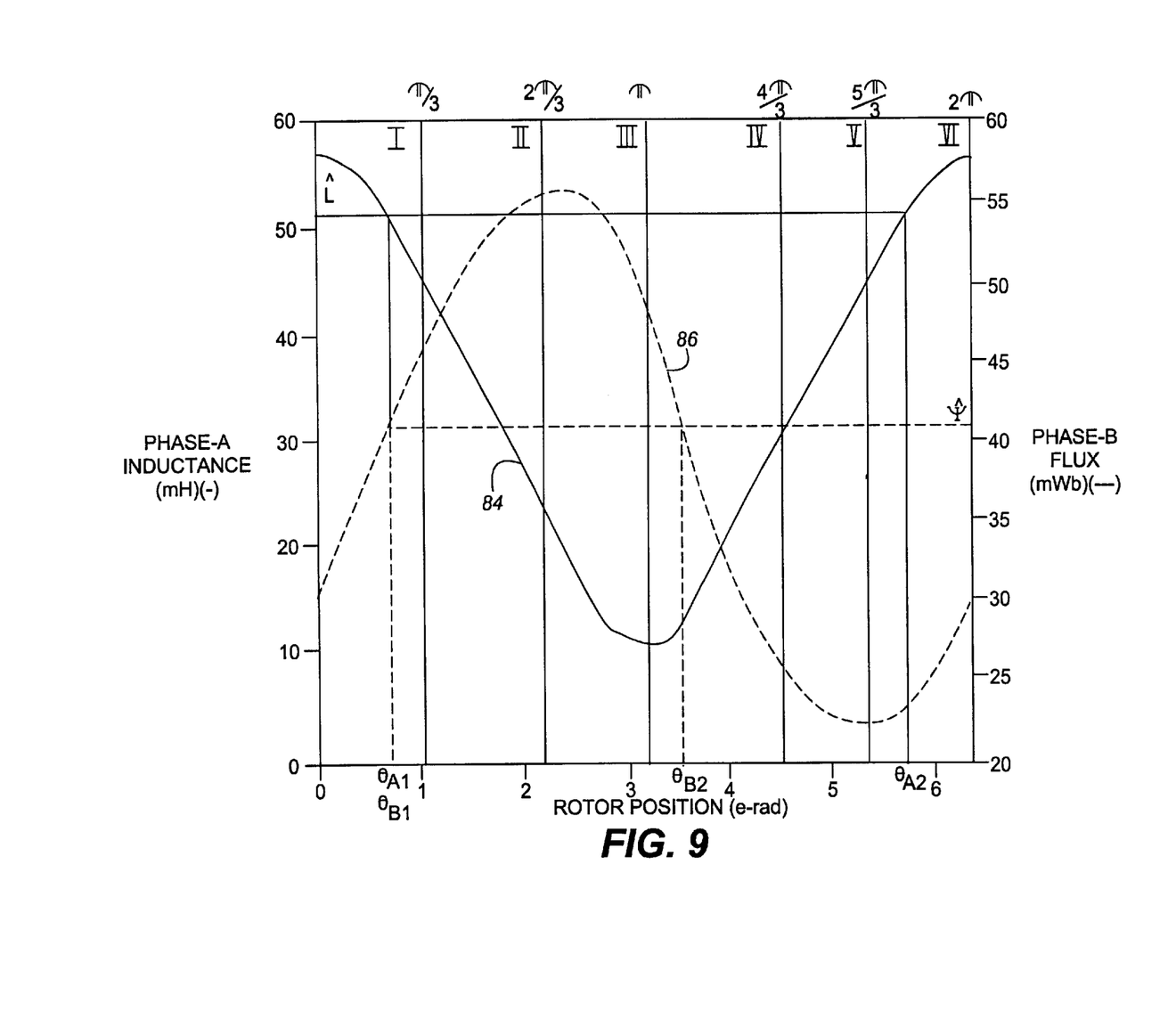
FIG. 9 is a pictorial representation of an overlay of the common domains of the phase flux estimate and phase inductance estimate demonstrating the resolution of the ambiguity regarding rotor position between the estimates.

Because rotor position is a double-valued function of either phase inductance or phase flux, for any fixed value of phase current, there is a need to resolve the ambiguity. With reference to FIG. 9, the present invention overcomes this hurdle by the use of at least two pieces of simultaneous data from at least two different phases, one or more phase inductances from unexcited phases and one or more phase fluxes from excited phases, to solve for a unique rotor position estimate. The figure illustrates phase inductance as a function of rotor position for phase A at a particular phase current as waveform 84. Overlapping this is illustrated phase flux as a function of rotor position for phase B at a particular phase current as waveform 86. For representative purposes the overlapping domain indications I–VI of the two functions along the θ axis have also been shown. The use of a single inductance estimate provides two rotor position estimates ($\theta_{A1}$ in domain I and $\theta_{A2}$ in domain VI), and use of a single flux estimate provides two rotor position estimates ($\theta_{B1}$ in domain I and $\theta_{B2}$ in domain IV). By utilizing both the phase inductance and phase flux estimates, a unique position estimate is made by the common solution between the two, the angle indicated by $\theta_{A1}$ and $\theta_{B1}$ in common domain I.

The method of the present invention solves the ambiguity problem by determining the common solution for the phase flux and phase inductance estimates. In the normal mode of operation for a SRM, as discussed previously, there will always be at least one phase which is excited and at least one phase which is unexcited, and hence the two pieces of data needed to resolve position ambiguity are always available. Each excited phase can be used to produce an estimate of phase flux $\hat{\Psi}$, while each unexcited phase can be probed to get an estimate of phase inductance $\hat{L}$. Therefore, each estimate, together with its phase current, generates two possible domain indications. The two sets of domain values are then matched to determine the common domain and the common estimated rotor position.

Figure 10:
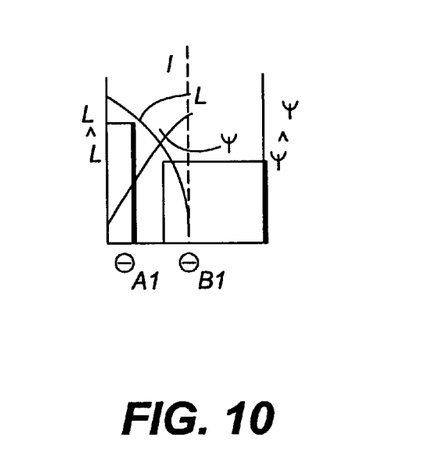
FIG. 10 is a partially fragmented pictorial representation of the common domain used for ambiguity resolution when the solutions are not exactly the same.

But, typically as shown in FIG. 10, the two solutions in the common domain do not exactly match. The solutions $\theta_{A1}$ and $\theta_{B1}$ are close in value for rotor position but there is a difference without knowing which solution is in error and by how much. If they are really close, then the process can declare that either value or an average is the estimate. However, much of the time there is more difference than is acceptable. This difference occurs because of noise in the measurement of the phase voltages and currents and errors during the estimation processes for the phase flux and phase inductance values. The invention conveniently solves this problem by using the information obtained from the common domain matching, and the original piecewise model to more accurately estimate the rotor position. Once the common domain is known, a system of linear equations can be written to estimate the rotor position. For each unexcited phase an equation of the form $$\hat{L} = A_1(i) + A_2(i)\hat{\theta}$$

is considered, and for each excited phase an equation of the form $$\hat{\Psi} = B_1(i) + B_2(i)\hat{\theta}$$

is considered. The coefficients A, B that are used are the ones stored for the original model for the particular common domain. Once the system of constraint equations is formulated, a least-squares solution for θ is used to estimate the optimal rotor position. Moreover, weighted least-squares methods can also be used to take advantage of any knowledge regarding which phases are the best indicators of position at any given point in time.

More specifically, note that equations above containing $\hat{L}$ and $\hat{\Psi}$ together represent two competing constraints on the rotor position estimate $\hat{\theta}$. If the noise on the phase voltage and phase current measurements were negligible, and if the error introduced in the estimation of phase inductance and phase flux were also negligible, then either of the two equations could be solved separately to yield an accurate, double-valued estimate of rotor position θ. However, since measurement noise and other sources of estimation error are typically too large to neglect, a preferred approach is to compute the rotor position estimate which solves the weighted least-squares optimization problem set forth below:

MIN $W_1(\hat{L}-(A_1(i)-A_2(i)\hat{\theta}))^2 + W_2(\hat{\Psi}-(B_1(i)-B_2(i)\hat{\theta}))^2$ where $W_1>0$ and $W_2>0$ are the weights which affect how well the rotor position estimate must fit the given inductance and flux estimates, respectively.

The rotor position estimate which minimizes the above penalty function is:

$$\text{Estimated } \hat{\theta} = \frac{W_1 A_2(i)(\hat{L} - A_1(i)) + W_2 B_2(i)(\hat{\psi} - B_1(i))}{W_1 A_2(i)^2 + W_2 B_2(i)^2}$$

Those skilled in the art will appreciate that the above rotor position estimation method may be easily extended to the case where more than one inductance estimate and/or more than one flux estimate per sampling period is included in the set of constraint equations and is subsequently used in the weighted least-squares computation of the rotor position estimate $\hat{\theta}$.

The present invention combines both flux and inductance estimates in the rotor position estimation procedure, and addresses the measurement noise issue through the use of least-squares data fitting. Unlike prior art methods, the method of the present invention is not confined to deriving rotor position estimates from inductance measurements alone or from flux measurements alone. The estimates of phase inductance from at least one phase and phase flux from at least one other phase are processed together to estimate a unique rotor position. The present invention does not require use of extrapolation, nor does it need information about the particular mode of operation (e.g., forward or reverse motoring or generating). By combining flux estimates and inductance estimates, the present invention eliminates rotor position ambiguity 100% of the time for 3-phase SRMs.

Although the invention has been described with reference to preferred embodiments thereof, it is to be understood that these embodiments are merely illustrative of the application of the principles of the invention. Numerous modifications may be made therein without departing from the scope and spirit of the invention as set forth in the following claims.

What is claimed is:

1. A method for estimating the rotor position of a switched reluctance motor of the type operating with at least one excited phase and at least one unexcited phase, comprising the steps of:

measuring phase voltages and phase currents for the at least one excited phase and for the at least one unexcited phase;

calculating an indirect estimate of phase flux for the at least one excited phase and an indirect estimate of phase inductance for the at least one unexcited phase using the measured phase voltages and phase currents;

selecting a first set of domain values from a predetermined flux model based upon the phase voltage and the phase current for the at least one excited phase;

selecting a second set of domain values from a predetermined inductance model based upon the phase voltage and the phase current for the at least one unexcited phase;

determining a final domain value based upon both the first set of domain values and the second set of domain values; and determining an estimated rotor position utilizing said final domain value.

2. The method of claim 1 wherein said step which includes estimating phase flux comprises time integration of phase voltage and phase current from said at least one excited phase.

3. The method of claim 1 wherein said step which includes estimating phase inductance comprises applying a voltage pulse to said at least one unexcited phase and measuring the resulting change in current.

4. The method of claim 1 wherein one of either a flux estimate or an inductance estimate is continuously determined for all phases at all times.

5. The method of claim 1 wherein said estimated rotor position is determined from a least-squares solution of flux and inductance characteristics.

6. The method of claim 5 wherein said least-squares solution is evaluated using different weights for each phase equation.

7. A method for controlling the rotor position of a switched reluctance motor of the type operating with at least one excited phase and at least one unexcited phase, comprising the steps of:

measuring phase voltages and phase currents for at least one excited phase and for at least one unexcited phase;

calculating an indirect estimate of phase flux for the at least one excited phase and an indirect estimate of phase inductance for the at least one unexcited phase using the measured phase voltages and phase currents;

selecting a first set of domain values from a predetermined flux model based upon the phase voltage and the phase current for the at least one excited phase:

selecting a second set of domain values from a predetermined inductance model based upon the phase voltage and the phase current for the at least one unexcited phase:

determining a final domain value based upon both the first set of domain values and the second set of domain values;

determining an estimated rotor position utilizing said final domain value;

estimating the rotor velocity from the estimated rotor position; and applying excitation to the motor in response to the estimated rotor position and rotor velocity to urge the rotor position to a desired rotor position or to follow a desired rotor position trajectory.

8. The method of claim 7 wherein said step which includes estimating phase flux comprises time integration of phase voltage and phase current from said at least one excited phase.

9. The method of claim 7 wherein said step which includes estimating phase inductance comprises applying a voltage pulse to said at least one unexcited phase and measuring the resulting change in current.

10. The method of claim 7 wherein one of either a flux estimate or an inductance estimate is continuously determined for all phases at all times.

11. The method of claim 7 wherein the estimated rotor position is determined from a least-squares solution of flux and inductance characteristics.

12. The method of claim 11 wherein said least-squares solution is evaluated using different weights for each phase equation.

13. The method of claim 7 wherein said step of estimating rotor velocity comprises approximate time-differentiation of the estimated rotor position.

14. A method for controlling the rotor velocity of a switched reluctance motor of the type operating with at least one excited phase and at least one unexcited phase, comprising the steps of:

measuring phase voltages and phase currents for at least one excited phase and for at least one unexcited phase;

calculating an indirect estimate of phase flux for the at least one excited phase and an indirect estimate of phase inductance for the at least one unexcited phase using the measured phase voltages and phase currents;

selecting a first set of domain values from a predetermined flux model based upon the phase voltage and the phase current for the at least one excited phase;

selecting a second set of domain values from a predetermined inductance model based upon the phase voltage and the phase current for the at least one unexcited phase;

determining a final domain value based upon both the first set of domain values and the second set of domain values;

determining an estimated rotor position utilizing said final domain value;

estimating the rotor velocity from the estimated rotor position; and applying excitation to the motor in response to the estimated rotor position and rotor velocity to urge the rotor velocity to a desired rotor velocity or to follow a desired rotor velocity trajectory.

15. The method of claim 14 wherein said step which includes estimating phase flux comprises time integration of phase voltage and phase current from said at least one excited phase.

16. The method of claim 14 wherein said step which includes estimating phase inductance comprises applying a voltage pulse to said at least one unexcited phase and measuring the resulting change in current.

17. The method of claim 14 wherein one of either a flux estimate or an inductance estimate is continuously determined for all phases at all times.

18. The method of claim 14 wherein the estimated rotor position is determined from a least-squares solution of flux and inductance characteristics.

19. The method of claim 18 wherein said least-squares solution is evaluated using different weights for each phase equation.

20. The method of claim 14 wherein said step of estimating rotor velocity comprises approximate time-differentiation of the estimated rotor position.

* * * * *